July 25, 1961

R. W. BERRY 2,993,266

METHOD OF MAKING A CAPACITOR EMPLOYING
FILM-FORMING METAL ELECTRODE

Filed June 16, 1958

INVENTOR
R.W. BERRY
BY
George S. Indig
ATTORNEY

2,993,266
METHOD OF MAKING A CAPACITOR EMPLOYING FILM-FORMING METAL ELECTRODE
Robert W. Berry, Florham Park, N.J., assignor to Bell Telephone Laboratories, Incorporated, New York, N.Y., a corporation of New York
Filed June 16, 1958, Ser. No. 742,068
7 Claims. (Cl. 29—25.42)

This invention relates to methods for making capacitors utilizing a film-forming metal as one of the electrodes, an oxide layer of the film-forming metal produced by anodization as the dielectric, and an electrically conductive counter-electrode, and also relates to capacitors produced by such methods. The methods and devices of this invention are particularly suitable for use in printed circuits.

There is a group of metals including tantalum, tungsten, aluminum, niobium, titanium, hafnium and zirconium, whose oxides are known to be excellent dielectric materials which are well suited for use in capacitors. An inherent advantage of the use of such oxides as the dielectric layer in a capacitor is that it is possible to produce the oxide layer by electrolytically anodizing a body of the pure metal, which latter is in turn utilized as one electrode of the capacitor. Heretofore, such an anodized electrode has been successfully utilized in a solid electrolytic capacitor in which the electrolyte facilitated the healing or rebuilding of discontinuities or irregularities in the dielectric oxide film. (See application Serial No. 346,416, filed April 2, 1953.)

With the advent of semiconductive devices, miniaturization of circuits and apparatus has been made possible. A widely used method for diminishing the size of electrical apparatus is the substitution of printed circuits for certain interconnected components. The incorporation of semiconductive devices into these printed circuits is a major advance in the ultimate goal of permitting the production of a printed circuit which is a complete substitute for any combination of components.

Many prior art attempts to produce a capacitor of configuration suitable for use in printed circuits involved structures which included a metal counter-electrode in direct contact with the anodized oxide film of a film-forming metal electrode. The structures were generally inoperative due to direct shorts between the two electrodes. Variations on this general structure which did not result in direct shorts suffered from the serious disadvantage that the maximum working voltage was only 10 percent to 15 percent of the anodizing voltage. Thus in order to obtain a capacitor which can be operated at reasonable operating voltages, exceedingly high voltages must be used during the anodizing procedure. Since the oxide film thickness produced in the anodizing step is proportional to the voltage there employed, and the capacitance is inversely proportional to the thickness of this oxide film, the area of the film-forming electrode must be increased to maintain the capacitance at a constant value.

In accordance with the present invention a method has been developed for producing capacitors of the structure described above which are suitable for continuous operation at 75 percent or more of the anodizing voltage. The method of this invention is particularly well suited for use in the manufacture of capacitors for use in printed circuits. The capacitors of this invention have extremely high capacitance per unit volume since there is no need to increase the oxide layer to achieve reasonable operating voltages, and in general have very low leakage currents which are comparable to those of mica capacitors.

The capacitors of this invention are essentially two-dimensional, having thicknesses as low as one micron, and accordingly are particularly well suited for use in printed circuits. A further advantage is that the capacitors may be produced directly on a substrate of the type usually employed in the manufacture of printed circuits.

Essentially the capacitors of this invention are produced in a three-step process. In the first step a layer of a film-forming metal is deposited on a substrate by condensation employing, for example, cathodic sputtering or vacuum evaporation techniques. The second step constitutes electrolytically anodizing the film-forming metal to produce a dielectric oxide layer. The last step consists of applying an electrically conductive counter-electrode in direct contact with the dielectric oxide film.

The invention will be better understood from the following more detailed description, taken in conjunction with the accompanying drawings in which.

Figure 1:
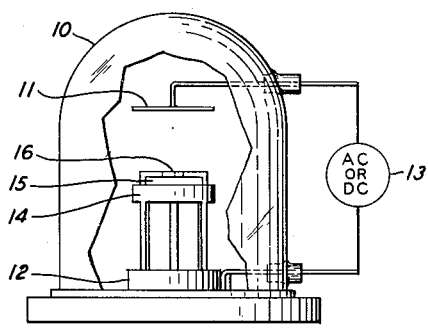
FIG. 1 is a schematic front elevational view of an apparatus suitable for use in producing a film of metal by cathodic sputtering in accordance with the present invention.

With reference now more particularly to the drawings, FIG. 1 depicts apparatus suitable for depositing a film-forming metal by cathodic sputtering. Shown in FIG. 1 is a vacuum chamber 10 in which are disposed cathode 11 and anode 12. Cathode 11 may be composed of the film-forming metal to be deposited or, alternatively, may serve as the base for the film-forming metal which latter may be in the form of a coating, foil, or other suitable physical form.

A source of electrical potential 13 is shown connected between cathode 11 and anode 12.

Platform 14 is employed as a positioning support for substrate 15 upon which the sputtered film is to be deposited. Mask 16 is placed on substrate 15 to restrict the deposition to the desired area.

Figure 2:
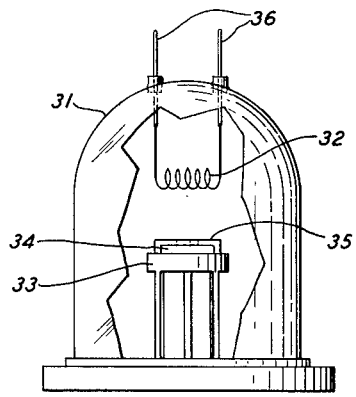
FIG. 2 is a schematic front elevational view of an apparatus suitable for use in producing a film of metal by vacuum evaporation in accordance with the present invention.

FIG. 2 is a schematic view of apparatus suitable for depositing a film-forming metal by vacuum evaporation techniques. This figure depicts a vacuum chamber 31 containing filament 32 and platform 33, which latter is employed as a positioning support for substrate 34. Mask 35 is utilized as shown to restrict the deposition of the film to the desired area.

The ends of filament 32 are connected to electrical leads 36 to permit flow of current therethrough from a source not shown.

Figure 3A:
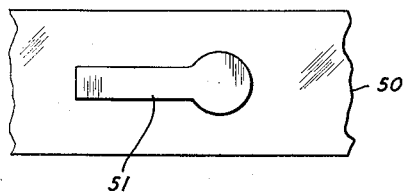
FIGS. 3A through 3C are plan views of a capacitor produced in accordance with the present invention in successive stages of fabrication.
Figure 3C:
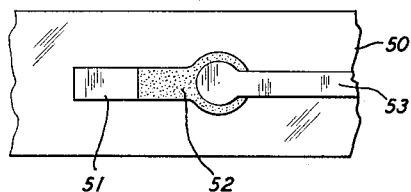
Figure 3B:
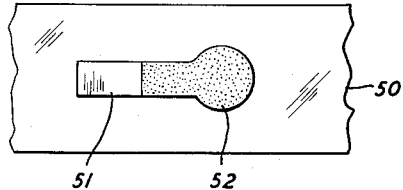

FIGS. 3A through 3C are plan views of a capacitor produced in accordance with the present invention. FIG. 3A shows substrate 50 upon which a film-forming metal layer 51 has been deposited. In accordance with this invention, layer 51 may be produced by a condensation method such as cathodic sputtering or vacuum evaporation techniques.

The metal layer 51 is next immersed in a typical anodizing electrolyte and made positive with respect to another electrode immersed in the electrolyte. The anodization is conducted to produce an oxide film 52, shown in FIG. 3B. As noted in this figure, a portion of original metal layer 51 does not have an oxide coating. This oxide-free portion includes the part of layer 51 to which the anodizing potential source was connected and accordingly was not immersed in the electrolyte.

The last step in the present process constitutes applying a counter-electrode in contact with oxide film 52. This is conveniently accomplished by vacuum evaporation. Other conventional methods of applying an electrically conductive layer are suitable provided the oxide layer 52 is neither thermally or mechanically disturbed. Shown in FIG. 3C is counter-electrode 53 in contact with oxide film 52.

Figure 4:
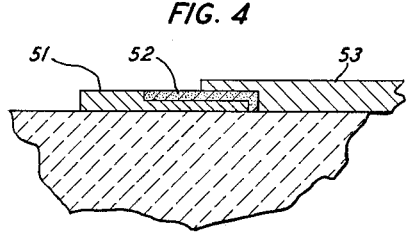
FIG. 4 is a sectional view of a capacitor produced in accordance with the present invention.

FIG. 4 is a sectional view of the capacitor which is shown in plan view in FIG. 3C. As may be seen from FIG. 4 the original layer 51 underlies oxide coating 52. The portion of layer 51 which extends beyond the oxide layer 52 furnishes a means of making electrical connection to this side of the capacitor. In the manufacture of the depicted device a mask or other means is employed to prevent short circuiting between counter-electrode 53 and the unoxidized portion of metal layer 51.

As disclosed, the inventive process contemplates the use of a substrate upon which the capacitor is produced. To be suitable, a substrate must conform to the requirements imposed by the various process steps. In some of these process steps, external means can be used to compensate for certain deficiencies in a substrate material and so permit its use. However, materials which are inherently suitable are preferred since their use simplifies the over-all process.

To obtain the best quality of metal deposit, it is preferred that the substrate be possessed of a smooth surface which is completely free from sharp changes in contour. The substrate should also be able to withstand temperatures as high as 300° C. to 400° C., since it may be heated to temperatures in this range during the deposition. Cathodic sputtering the surface is heated by bombardment with gas ions in addition to acting as a sink for the heat released by the deposition of the metal layer. During deposition by vacuum evaporation, the substrate is heated largely by radiation from the incandescent filament. All types of refractory materials such as glass, ceramics, and high-melting metals meet this requirement. However, external cooling permits the use of other materials.

The requirements of the anodizing step place additional limitations on the choice of a substrate material. Ideally, the substrate should have a high electrical resistance, as for example, glass or ceramic. This limitation arises from the fact that current must flow through the surface which is to be anodized to produce an oxide layer. During the initial period of an anodizing process a thin film of a dielectric oxide begins to form on the surface. If the substrate material has a substantially higher conductivity than this oxide film, the current previously flowing through the surface to be anodized will take the easier path through the substrate thereby effectively ending the anodization. Accordingly, a suitable substrate should have an electrical resistance at least comparable to the dielectric oxide. As an alternative to using dielectric materials, electrically conductive materials may be made suitable by external insulation for example by coating the substrate with a suitable insulating material. A second alternative, is the use of a film-forming metal upon which an insulating barrier develops during the anodizing step.

The particular condensation method used may be determined by the vapor pressure of the film-forming metal to be used. Those metals with low vapor pressures, such as tantalum and niobium, are most satisfactorily deposited by cathodic sputtering. Others having higher vapor pressures, for example, aluminum and titanium, are conveniently deposited by vacuum evaporation.

The present invention is conveniently described in detail by reference to a first illustrative example in which tantalum is employed as the film-forming metal. As indicated above, tantalum is most satisfactorily deposited by cathodic sputtering and, accordingly, an apparatus similar to that shown in FIG. 1 is used to produce a layer of tantalum on the substrate.

Preferred substrate materials for this invention are glasses, glazed ceramics, and film-forming metals. All of these materials meet the requirements of heat resistance and non-conductivity as set forth above. However, whereas glass and glazed ceramics are inherently smooth-surfaced, a substrate of a film-forming metal should be polished to ensure the absence of sharp surface irregularities to obtain the best quality film.

Substrate 15 is first rigorously cleaned. Conventional cleaning agents are suitable, the choice of a particular one being dependent upon the composition of the substrate itself. For example, where the substrate consists of glass or a glazed ceramic boiling in aqua regia is a convenient method of cleaning the surface.

Substrate 15 is placed upon the platform 14, as shown in FIG. 1, and mask 16 is then suitably positioned. Platform 14 and mask 16 may be fabricated from any refractory material. However, it may be convenient to use a metal, such as aluminum, for ease in fabricating mask 16. To obtain sharply defined deposits it is necessary to have mask 16 bearing against substrate 15 under externally applied pressure.

The conditions used in cathodic sputtering as employed in this invention are known. (See "Vacuum Deposition of Thin Films," L. Holland, J. Wylie & Sons, Inc., New York, 1956.) By this process the vacuum chamber is first evacuated, flushed with an inert gas, as for example any of the members of the rare gas family such as helium, argon, or neon, and the chamber is then re-evacuated. The extent of the vacuum required is dependent on consideration of several factors.

Increasing the inert gas pressure and thereby reducing the vacuum within chamber 10 increases the rate at which the metal being sputtered is removed from the cathode and accordingly increases the rate of deposition. The maximum pressure is usually dictated by power supply limitations since increasing the pressure also increases the current flow between anode 12 and cathode 11. A practical upper limit in this respect is 150 microns Hg for a sputtering voltage of the order of 5,000 volts. The ultimate maximum pressure is that at which the sputtering can be reasonably controlled within the prescribed tolerances. It follows, from the discussion above, that the minimum pressure is determined by the lowest deposition rate which can be economically tolerated.

After the requisite pressure is attained, cathode 11, which may be composed of tantalum or alternatively may be covered with tantalum for example in the form of a foil, is made electrically negative with respect to anode 12.

The minimum voltage necessary to produce sputtering is dependent upon the particular film-forming metal used. For example, a D.C. potential of about 4,000 volts is required to produce a sputtered layer of tantalum suitable for the purposes of this invention. The minimum voltage for other metals is known in the art. Increasing the potential difference between anode 12 and cathode 11 has the same effect as increasing the pressure, that of increasing both the rate of deposition and the current flow. Accordingly, the maximum voltage is dictated by consideration of the same factors controlling the maximum pressure.

The spacing between anode and cathode is not critical. However, the minimum separation is that required to produce a glow discharge which must be present for sputtering to occur. Many dark striations occur in the glow discharge produced during sputtering. Some of these striations are well known and have been given names, as for example, Crooke's Dark Space. (See Joos, "Theoretical Physics," Hafner, New York 1950, page 435 et seq.) For the best efficiency during the sputtering step, substrate 15 should be positioned immediately without Crooke's Dark Space on the side closest to the anode 12. Location of substrate 15 closer to the cathode 11 results in a metal deposit of poorer quality. Locating substrate 15 further from cathode 11 results in the impingement on the substrate by a smaller fraction of the total metal sputtered, thereby increasing the time necessary to produce a deposit of given thickness.

It must be noted that the location of Crooke's Dark Space changes with variations in the pressure, it moving closer to the cathode with increasing pressure. As the substrate is moved closer to the cathode it tends to act as an obstacle in the path of gas ions, which are bombarding the cathode.

Accordingly, the pressure should be maintained sufficiently low so that Crooke's Dark Space is located beyond the point at which a substrate would cause shielding of the cathode.

The balancing of these various factors of voltage, pressure, and relative positions of the cathode, anode, and substrate to obtain a high quality deposit is well known in the sputtering art. In addition to the effect of the parameters noted above it is to be appreciated that the acual sputtering rate is also dependent on the particular metal being sputtered.

With reference now more particularly to the example under discussion, by employing a proper voltage, pressure, and spacing of the various elements within the vacuum chamber, a layer of tantalum is deposited in a configuration determined by mask 16. The sputtering is conducted for a period of time calculated to produce the desired thickness.

For the purposes of this invention, the minimum thickness of the layer deposited on the substrate is dependent upon two factors. The first of these is the thickness of metal which is converted into the oxide form during the anodizing step. The second factor is the minimum thickness of unoxidized metal remaining after anodization commensurate with the maximum resistance which can be tolerated in the film-forming metal electrode. It has been determined that the preferred minimum thickness of the metal electrode is approximately 500 Angstroms regardless of the particular metal being used. There is no maximum limit on this thickness, although little advantage is gained by the increase above 1,500 Angstroms.

For anodizing voltages up to 250 volts, it has been determined that a metal deposit of at least 4,000 Angstroms is preferred. It is considered that of this 4,000 Angstroms a maximum of approximately 2,500 Angstroms is converted during the anodizing step leaving approximately 1,500 Angstroms as the electrode thickness.

Following the sputtering step, the metallic layer is anodized in an appropriate electrolyte. The voltage at which the anodizing is conducted is primarily determined by the voltage at which the capacitors are to be operated. The usual procedure followed is similar to conventional anodizing processes in which a low voltage is applied initially and the voltage is then increased so as to maintain a constant anodizing current.

For the anodization of tantalum in accordance with this invention, low conductivity electrolytes have been found to give good results. Examples of preferred electrolytes are aqueous solutions of oxalic acid, citric acid, tartaric acid, and phenol.

The last step in the fabrication of a capacitor in accordance with this invention is the application of a counter-electrode in contact with the oxide film. Any suitable method for producing an electrically conductive layer on the surface of the oxide layer is suitable provided such method does not mechanically or thermally disturb the oxide layer. Vacuum evaporation has been found to be especially suitable for producing counter-electrodes in accordance with this invention, metals such as aluminum and gold being conveniently used in conjunction with this technique. The evaporated layer is restricted by a mask. As can be seen in FIG. 3C, the configuration used facilitates the making of external electrical contact.

Since the counter-electrode must conduct all of the current which passes through the capacitor, its electrical resistance is desirably low. The minimum thickness is approximately 500 Angstroms, the preferred range being from 1,000 to 2,000 Angstroms. Little advantage is gained by using greater thicknesses.

A second illustrative example of this invention involves the production of a capacitor employing evaporation vacuum techniques to produce the layer of film-forming metal. The over-all process exclusive of the deposition step is essentially the same as that described in the first example. For the purposes of this illustration, aluminum is used as the film-forming metal which is to be evaporated.

Vacuum evaporation is generally conducted at extremely low pressures (see "Vacuum Deposition of Thin Films," supra). An apparatus similar to that shown in FIG. 2 is conveniently employed for this step. The extent of the vacuum is dictated by consideration of the vapor pressure of the metal to be evaporated. In conventional vacuum evaporation processes, it is generally considered that the vapor pressure of the metal to be evaporated should be at least ten times greater than the pressure to which the system is evacuated. In general, better quality films are obtained at higher vacuum. When using metals with relatively high vapor pressures, the maximum pressure which can be tolerated is that above which the oxygen present interferes with the deposition of a pure metallic film. For the evaporation of a metal such as aluminum, it has been determined that a pressure of approximately $\frac{1}{10}$ micron Hg is satisfactory.

The usual method of heating the metal to be evaporated is to position it in proximity to a filament which may be heated electrically. This is conveniently accomplished by using a tungsten filament in the shape of a coil, as shown in FIG. 2, and placing the metal to be evaporated within the coil. The required temperature is obtained by controlling the magnitude of the current flowing through the filament. Alternatively a filament of the metal to be evaporated may be used in those instances where the metal has a sufficiently high vapor pressure at temperatures below its melting point.

Vacuum chamber 31 is evacuated to the prescribed pressure and a current is passed through the tungsten filament 32. The filament becomes heated thereby causing the aluminum, not shown in FIG. 2, to evaporate.

The considerations discussed above with respect to the thickness of the layer produced in the first example also apply here. The thickness of the deposit produced depends upon the position of the substrate and the total amount of metal evaporated. These factors are known in the art.

The steps of anodizing the evaporated layer and of producing the counter-electrode are similar to those described above in the first example.

The capacitance of device capacitors of this invention is proportional to the surface area of the counter-electrode, and is inversely proportional to the anodizing voltage. Accordingly, by judicious choice of anodizing voltage and counter-electrode area, capacitors may be tailored to fit almost any desired combination of operating voltage and capacitance. As an indication of the magnitude of the capacitance of units produced by this invention, tantalum capacitors anodized at 100 volts are possessed of approximately 0.08 microfarad capacitance per square centimeter of counter-electrode area. Accordingly, a capacitor in which the counter-electrode is a circle 95 mils in diameter has a capacitance of approximately 4,500 micromicrofarads. The large capacitance to volume ratio of capacitors of this invention may be appreciated by the realization that a capacitor of this invention, less than one mil in thickness, in which the counter-electrode is a circle one-half inch in diameter has a capacitance of greater than .1 microfarad.

The capacitors produced in accordance with this inventio exhibit certain unidirectional characteristics which make it desirable that the film-forming electrode be made electrically positive with respect to the counter-electrode when the capacitor is in a D.C. circuit. These unidirectional characteristics are not as pronounced as in the usual wet or solid electrolytic capacitors. The capacitor of this invention may be utilized in certain A.C. circuits without bias.

It is possible to achieve an extraordinarily high capacitance per unit volume by employing the process of the present invention in the following manner. A film-forming metal is deposited on both broad faces of a thin substrate, such as a glass ribbon approximately 3 mils thick. The two metal deposits are anodized and counter-electrodes then affixed thereto. Several such units are stacked, a first common connection being made between the counter-electrodes and a second common connection being made between the film-forming metal electrodes. Such a structure can provide capacitances as high as 85 microfarads per cubic inch of volume.

In the claims appended to this disclosure, the term "condensation" is used to describe the method by which the film-forming metal layer is produced on the substrate. In the sense that "condensation" is descriptive of the formation of a more compact mass, this word is intended to include the formation of the metal layer by either cathodic sputtering or vacuum evaporation techniques.

Several examples of the present invention are described in detail below. These examples and the two illustrations described above are included merely to aid in the understanding of the invention, and variations may be made by one skilled in the art without departing from the spirit and scope of this invention.

Listed below are four examples directed to the practice of the present invention:

*Example 1*

This example describes the production of a capacitor of this invention which employs tantalum as the film-forming metal.

A cathodic sputtering apparatus similar to that shown in FIG. 1 was used to produce the tantalum layer. In the apparatus actually employed, the anode was grounded, the potential difference being obtained by making the cathode negative with respect to ground.

A glass microscope slide was used as the substrate. The slide was boiled in aqua regia, rinsed in distilled water and flame-dried to produce a clean surface. The tantalum, which was of annealed capacitor grade, was employed in the shape of a foil which was wrapped around the cathode of the sputtering apparatus.

The vacuum chamber was initially evacuated to a low pressure of the order of 0.4 micron Hg, flushed with argon, and reevacuated to 20 microns Hg.

The anode and cathode were spaced approximately 4 inches apart, the masked substrate being placed therebetween at a position immediately outside Crooke's Dark Space. A D.C. voltage of approximately 4500 volts was impressed between cathode and anode. At the voltage and pressure here employed the location of Crooke's Dark Space was such as to dictate the placement of the microscope slide substrate at a distance of 2 inches from the cathode.

Sputtering was conducted for 60 minutes giving a layer of tantalum approximately 2000 Angstroms thick in the area exposed by the mask.

The sputtered tantalum layer was then anodized in an electrolyte consisting of 60 parts by weight of oxalic acid, 180 parts by weight of ethylene glycol and 120 parts by weight of distilled water. The electrolyte was maintained at approximately 105° C. during the anodizing step. The procedure followed was to employ a small voltage initially to produce a current density of approximately one-half milliampere per square centimeter of surface area. The voltage was increased to 100 volts, while maintaining the current at an approximately constant value. The voltage was maintained at 100 volts for approximately four hours, after which the anodized layer was washed in distilled water.

A circular gold counter-electrode 95 mils in diameter and 1000 Angstroms thick was evaporated onto the anodized metal. The device so made has a capacitance of approximately 5000 micromicrofarads.

*Example 2*

This example describes the production of a capacitor of this invention in which aluminum was evaporated onto a substrate to form the requisite metal layer.

An apparatus similar to that shown in FIG. 2 was employed, the filament being composed of tungsten. The substrate employed was a microscope slide which was cleaned in a manner similar to that described in Example 1. After cleaning, the slide was placed approximately 3½ inches from the tungsten filament and a mask placed on the slide. A 2-inch piece of highly purified aluminum wire, 30 mils in diameter, was placed within the tungsten filament. The vacuum chamber was evacuated to a pressure of approximately .01 micron Hg. Current was caused to flow through the tungsten filament, heating it to incandescence and thereby heating the aluminum wire and causing it to evaporate. The 2-inch piece of aluminum wire was completely evaporated in a period of time less than three minutes, and a layer of aluminum 3000 Angstroms thick was produced on the exposed portions of the slide.

The aluminum layer was then anodized in an electrolyte made in the following manner. Twelve grams of tartaric acid were added to 400 milliliters of distilled water. Six normal ammonium hydroxide was then added to produce a pH of 5.5. The electrolyte was maintained at approximately 25° C. during the anodizing step. A low voltage was employed initially to produce a current density of approximately 10 milliamperes per square centimeter of surface area. The anodizing voltage was increased to 100 volts, maintaining the current density constant, and the process conducted at a voltage of 100 volts for a period of one hour.

A circular aluminum counter-electrode 95 mils in diameter and 2000 Angstroms thick, was evaporated onto the anodized layer. The device so made had a capacitance of approximately 3500 micromicrofarads.

*Example 3*

This example describes the production of a capacitor in which titanium was used as the film-forming metal. The titanium layer was produced on a glass microscope slide by a method similar to that employed in Example 2 above, a 2-inch piece of highly purified titanium wire, 30 mils in diameter, being used as the evaporation source.

The glass slide was maintained at approximately 200° C. during the evaporation to enable the production of a more adherent metal layer. A layer of titanium 3000 Angstroms thick was produced. Following the evaporation, the slide and metal layer were cooled to below approximately 75° C. before being removed from the vacuum chamber.

The anodizing electrolyte employed consisted of approximately 120 grams of boric acid, approximately 20 grams of sodium borate ($Na_2B_4O_7 \cdot 10H_2O$) and approximately 4 liters of distilled water. This electrolyte was maintained at approximately 25° C. during the anodizing procedure. The anodizing voltage of 50 volts was applied initially irrespective of the current density and this voltage maintained for a period of approximately 30 minutes. The slide and anodized layer were then rinsed in distilled water.

A circular gold counter-electrode 95 mils in diameter and 2000 Angstroms thick was evaporated onto the anodized titanium. The device so made had a capacitance of approximately 13,000 micromicrofarads.

Example 4

This example describes the production of a capacitor of this invention employing niobium as the film-forming metal. The procedure used was substantially the same as that employed in Example 1.

The source of niobium used was in the shape of a foil which was wrapped around the cathode in the sputtering apparatus.

The pressure of argon in which the sputtering was conducted was 20 microns Hg, the impressed voltage being a direct-current potential of 4500 volts. The sputtering was conducted for approximately 60 minutes producing a layer of niobium approximately 3000 Angstroms thick. During the sputtering the anode, cathode and substrate were positioned in a manner identical to that employed in Example 1.

The anodizing procedure here employed was substantially the same as that used in Example 1, except that the electrolyte was maintained at 75° C., the anodizing voltage was 40 volts, and the time was 30 minutes.

A circular gold counter-electrode 95 mils in diameter and 2,000 Angstroms thick was evaporated onto the anodized niobium. The device so made had a capacitance of approximately 9,000 micromicrofarads.

What is claimed is:

1. The method of making a capacitor which comprises the steps of producing a layer of a film-forming metal selected from the group consisting of tantalum, niobium and on a non-conducting substrate by condensation, electrolytically anodizing a portion of the said film-forming metal layer, and applying an electrically conductive film to the anodized portion.
2. The method of claim 1 in which the film-forming metal layer is produced by cathodic sputtering.
3. The method of claim 1 in which the film-forming metal layer is produced by vacuum evaporation.
4. The method of claim 1 in which the film-forming metal is tantalum.
5. The method of claim 1 in which the film-forming metal is niobium.
6. The method of claim 1 in which the said electrically conductive layer is produced by vacuum evaporation.
7. The method of claim 1, in which method the substrate surface on which the film-forming metal is condensed has a high electrical resistance.

References Cited in the file of this patent

FOREIGN PATENTS

| | | |
|---|---|---|
| 396,453 | Great Britain | Aug. 10, 1933 |
| 620,405 | Great Britain | Mar. 24, 1949 |